US005158525A

United States Patent [19]

Nikkel

[11] Patent Number: 5,158,525

[45] Date of Patent: Oct. 27, 1992

[54] ADJUSTABLE WEAR PADS FOR SLOTTING HEAD YOKE PLATES

[75] Inventor: Willem A. Nikkel, Covington, Va.

[73] Assignee: Westvaco Corporation, New York, N.Y.

[21] Appl. No.: 823,471

[22] Filed: Jan. 22, 1992

[51] Int. Cl.[5] ........................ F16C 17/04; F16C 23/02; B31F 1/10; B26D 1/24

[52] U.S. Cl. .................................... 493/471; 493/370; 493/475; 83/499; 384/248; 384/308

[58] Field of Search .................. 384/248, 308; 83/499; 493/365, 367, 370, 403, 471, 475

[56] References Cited

U.S. PATENT DOCUMENTS 4,926,730 5/1990 Garrett .................................. 83/499
4,962,684 10/1990 Mowry .................................. 83/332
5,123,891 6/1992 Nieradka et al. .................. 493/370

OTHER PUBLICATIONS

"Long-Life Yokes and Heads for Flexo Folder Gluers", Brochure, Gartech Manufacturing Co. n.d.

*Primary Examiner*—William E. Terrell
*Attorney, Agent, or Firm*—W. A. Marcontell; R. L. Schmalz

[57] ABSTRACT

Box machine forming wheels are individually stabilized with a respective, frame mounted, stationary yoke meshed within the circumferential groove of a head wheel that is rigidly secured to the forming wheel. Lateral space between the stationary yoke finger faces and the rotating groove walls is adjustably filled by cam displaced disc pads confined within yoke finger guide bores. Selective cam rotation expands the disc pad assembly for operational wear accommodation.

10 Claims, 4 Drawing Sheets

FIG. 9
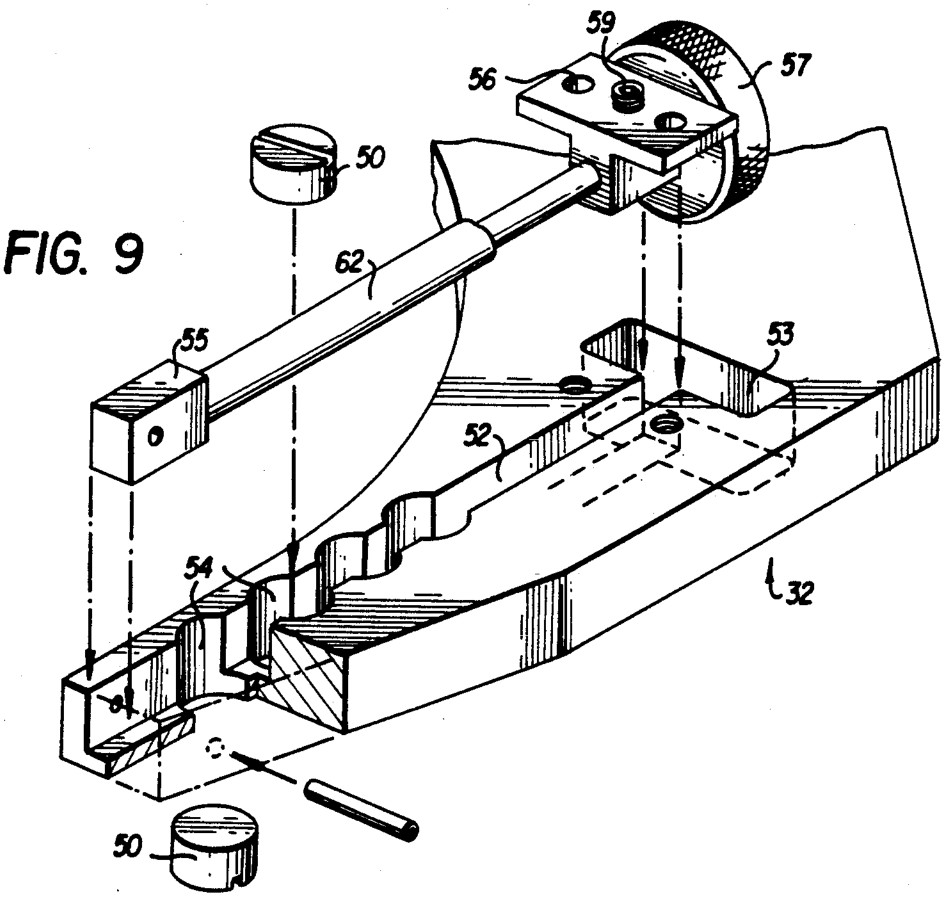
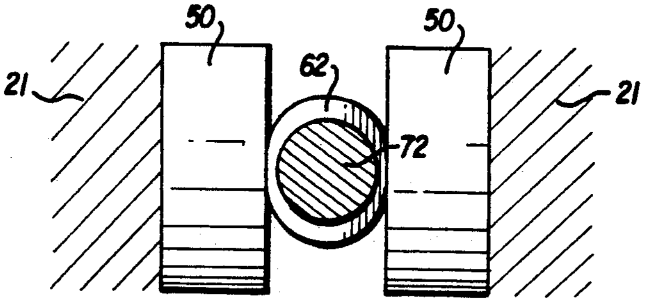
FIG. 10
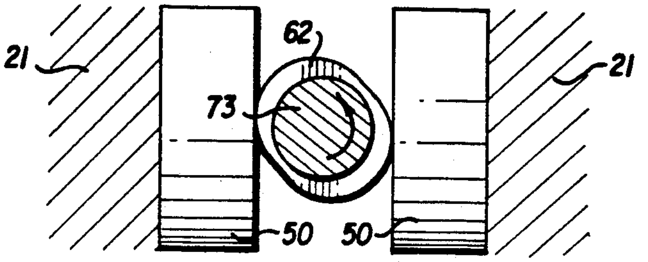
FIG. 11
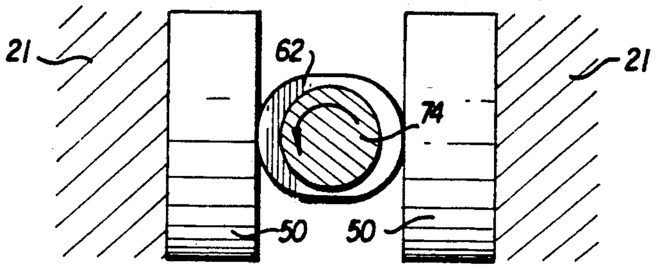
FIG. 12

ADJUSTABLE WEAR PADS FOR SLOTTING HEAD YOKE PLATES

BACKGROUND OF THE INVENTION

1. Field of the Invention

The present invention relates to machinery for forming box blanks from corrugated paperboard sheet material.

2. Description of the Prior Art

Corrugated paperboard box blanks are fabricated from uniform corrugated sheet material by the selective placement of scores, slots and slits in a blank sheet. Such scores, slots and slits are applied by rotary dies or knives as individual sheet units are nip driven along a machine path between respective die or knife sets.

At commercial production rates and speeds, this material forming process represents severe service for the production machinery due to the strength, stiffness and abrasiveness of the process material. One consequence of such service severity is a tendency of the mating die and knife sets to laterally misalign under the operational stress. Cutting and scoring edges destructively clash together.

To reduce and control such damaging misalignment, these rotary units have been laterally stabilized with a thrust pad mechanism characterized as a "yoke" and "head" set. Each rotary die, knife or scoring wheel is integrally paired with a massive annular groove wheel called a "head." A cooperative "yoke" includes two finger projections from an integral heel section that is secured to the machine frame. Tips of the finger projections mesh with the head groove space on diametrically opposite sides of the wheel unit. Pads or bearings secured to the stationary yoke tips side in contact with the rotating head groove walls. Lateral stress on the die, knife or scoring wheel is directly transferred to and resisted by the yoke fingers Simultaneously, however, wear loss of the finger pad material increasingly reduces the sliding contact bias against the head groove walls. After sufficient wear, the pads must be either replaced or repaired. Repair constitutes the insertion of a shim between the pad and the finger structure. In either case, repair or replacement, correction is time consuming and expensive due to the consequential loss of production time.

In recognition of this maintenance burden against corrugated box making machinery, the Gartech Manufacturing Co. of Litchfield, Ill. has introduced a stabilizer assembly design which includes two roller bearings mounted within each yoke finger in lieu of traditional wear pads. These two roller bearings are transversely positioned across the finger thickness whereby each outer race surface runs against a respective head groove wall.

Although the Gartech stabilizer assembly design is an effective solution to the maintenance burdens created by yoke trust pad wear, the design is sufficiently expensive to manufacture as to largely negate the maintenance savings from the design.

It is, therefore, an objective of the present invention to provide a corrugated box machine rotational stabilizer assembly that is both inexpensive to manufacture and requires no machine down time to adjust.

Another object of the present invention is to provide an adjustable thrust bearing mechanism for corrugated box machine rotational stabilizers that will fit within the dimensional confines of traditional head grooves and yoke fingers.

Another object of the present invention is to provide an adjustable thrust bearing mechanism for corrugated box machine rotational stabilizers that may be adjusted in a few minutes rather than several hours.

SUMMARY OF THE INVENTION

These and other objects of the invention are accomplished by means of expansible yoke pads. A plurality of disc shape pads are positioned on opposite faces of a yoke finger in the area of head groove space penetration. Both pad face sets are confined to laterally outward movement against the head groove walls by receptacle bore walls within a respective yoke finger. Receptacle bores within respective yoke fingers are axially continuous between opposite finger faces transversely of the finger face planes. Axially intersecting each dowel bore along the finger length is an elongated eccentric shaft. Inner ends of opposite pads are engaged by the eccentric shaft surface.

As the pad faces wear from sliding contact with the head groove side walls, the resulting clearance space is periodically closed by angular rotation of the eccentric shaft. A shaft rotational drive handle, knob or wheel is conveniently located for manual adjustment to minimize machine downtime.

BRIEF DESCRIPTION OF THE DRAWINGS

Relative to the drawings wherein like reference characters designate like or similar elements throughout the several figures of the drawings:

FIG. 9 is a perspective view of the third embodiment of the invention;

FIG. 10 is a schematic of the disc pad and eccentric relationship with minimum adjustment;

FIG. 11 is a schematic of the disc pad and eccentric relationship with moderate adjustment; and, FIG. 12 is a schematic of the disc pad and eccentric relationship with maximum adjustment.

DESCRIPTION OF THE PREFERRED EMBODIMENTS

Corrugated box blank forming machines comprise a series of operating stations along a material travel route. Functionally, a blank sheet of corrugated board is cut to final blank size, side walls are segregated by slotting and slitting and fold lines are scored. Each of these operations is executed between a pair of axle shaft carried tool wheels. The tool wheels carry a respective operating tool, be it a die knife meshing with a die anvil or a score ridge meshing with a score groove. Rotation of the wheel carriage axles and placement of one or more operating tools around the wheel circumference is coordinated to apply the desired operation to the box blank as it advances between these wheels along the material travel route.

Figure 1:
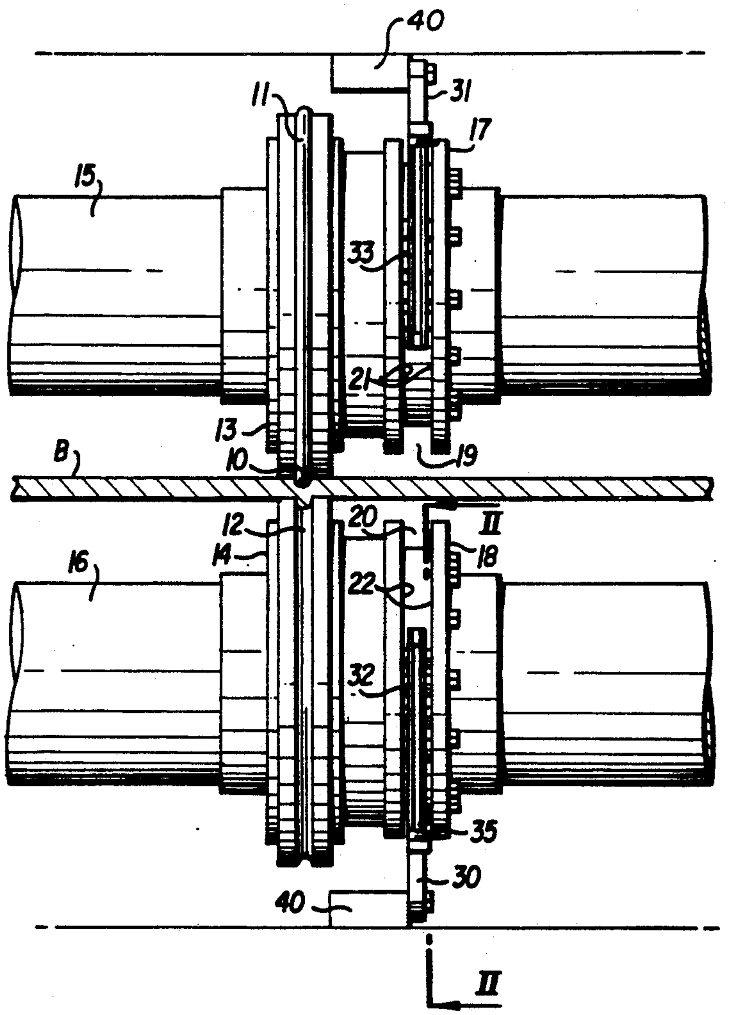
FIG. 1 is an elevational view of a cooperative pair of box blank scoring wheels stabilized by the present invention.

FIG. 1 illustrates a typical scoring station whereat a box blank portion B receives a score line 10 between a circular, tool wheel carried ridge 11 and a circular, tool wheel carried groove 12. It will be understood by those with skill in the art that in lieu of the scoring ridge and groove, the tool carrier wheels may just as well carry a die knife or die anvil.

Tool carriage wheels 13 and 14 are respectively driven rotatively by parallel axles 15 and 16. Each tool carriage wheel is provided with a grooved head wheel 17 and 18, respectively, and the two are rigidly unitized and secured to a respective axle. The grooves 19 and 20 respective to each head wheel 17 and 18 are formed between oppositely facing parallel groove walls 21 and 22.

Figure 2:
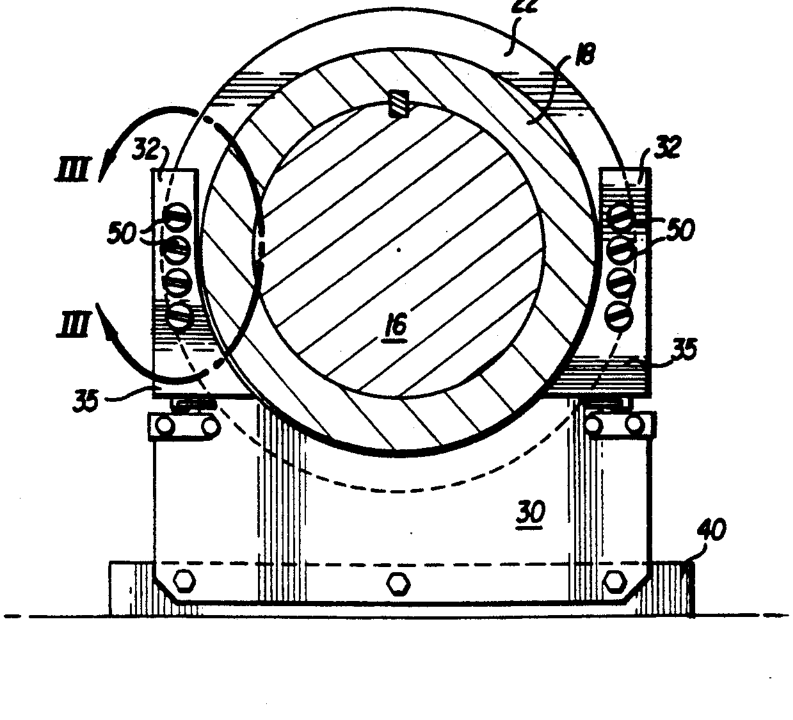
FIG. 2 is a sectional end elevation viewed along the cutting plane of II—II in FIG. 1.
Figure 3:
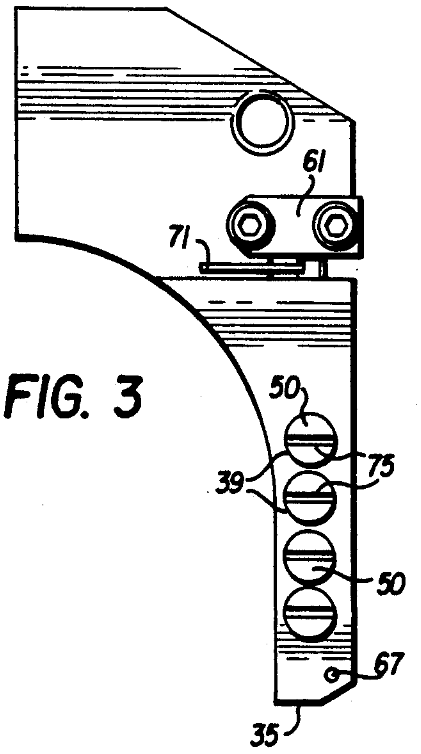
FIG. 3 is an elevational face view of a yoke finger equipped with a first embodiment of the invention.
Figure 4:
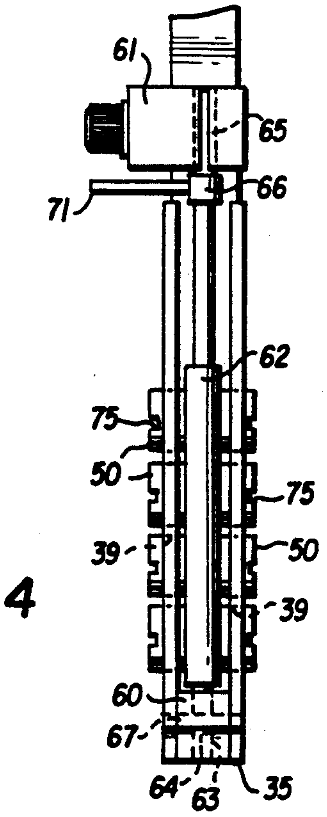
FIG. 4 is an elevational end view of a yoke finger equipped with a first embodiment of the invention.

For each head wheel, a yoke plate 30 and 31 is rigidly secured to a frame member 40 in planar alignment with corresponding head grooves 19 and 20. Each yoke plate 30 and 31 includes a pair of finger projections 32 and 33 from a heel base aligned within respective head grooves 20 and 19. Projecting from the opposite finger side faces are disc shaped pads 50 as shown clearly by the FIG. 2 section and the details of the remaining Figures.

Standard industry dimensions for this assembly include a head groove width of about 0.875 inch and a depth of about 1.25 inches. The yoke plate is about 0.625 inch thick to leave a 0.125 inch space between each yoke face and the adjacent groove wall. This 0.125 inch space is spanned by the pads.

Figure 5:
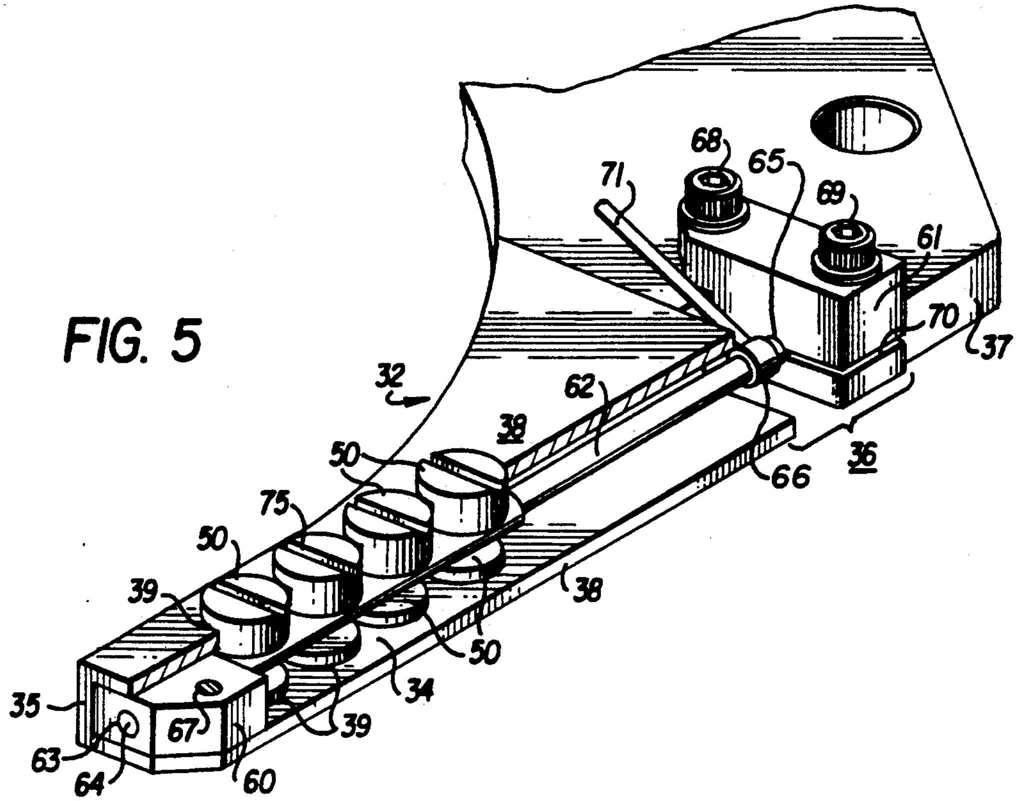
FIG. 5 is a perspective view of the first embodiment of the invention.

The first embodiment of the invention shown in FIG. 5 provides a slot 34 along the finger projection length from the terminal end 35 to a transverse notch 36 between opposite face plates 38. This longitudinal slot 34 opens from the outside finger edge 37 opposite from the head wheel. Receptacle bores 39 are cut into the face plate 38 material along an axis that is transverse to the parallel outer planes of the face plates.

Within the longitudinal slot 34 is secured an eccentric rod assembly comprising an end bearing block 60, a mid-bearing block 61 and an eccentric shaft 62. A journal socket 63 in the end bearing block 60 receives one distal end 64 of the shaft 62 whereas journal socket 65 in the mid-bearing block 61 receives the other distal end 66 of the shaft 62. A transverse roll pin 67 confines the end bearing block 60 within the slot 34.

Mid-bearing block 61 is secured to the yoke structure by means of a cap screw 68. Cap screw 69 cooperates with slot 70 to clamp the eccentric shaft 62 in the desired angular position. The space represented by slot 70 intersects with the space represented by journal socket 65. Adjustment rod 71 penetrates eccentric shaft 62 to facilitate angular rotation and setting of the unit.

Dimensioned to a sliding fit within each receptacle bore space 39 is a disc shaped pad 50. The present embodiment of the invention provides four such pads 50 projecting from each yoke face.

Axially, each pad 50 is confined within its respective receptacle bore 39 by the adjacent head groove wall 21 or 22 and a longitudinal perimeter element of eccentric 62. With specific reference to the sequential schematics of FIGS. 10, 11 and 12, new, maximum thickness pads 50 are shown in FIG. 10 to be coordinated with a minimum eccentric diameter 72. Similarly, FIG. 11 shows moderately worn pads 50 to be biased apart by an intermediate eccentric diameter 73. FIG. 12 illustrates the eccentric 62 to be rotated to the maximum eccentric diameter alignment 74 between opposing pads 50.

Figure 6:
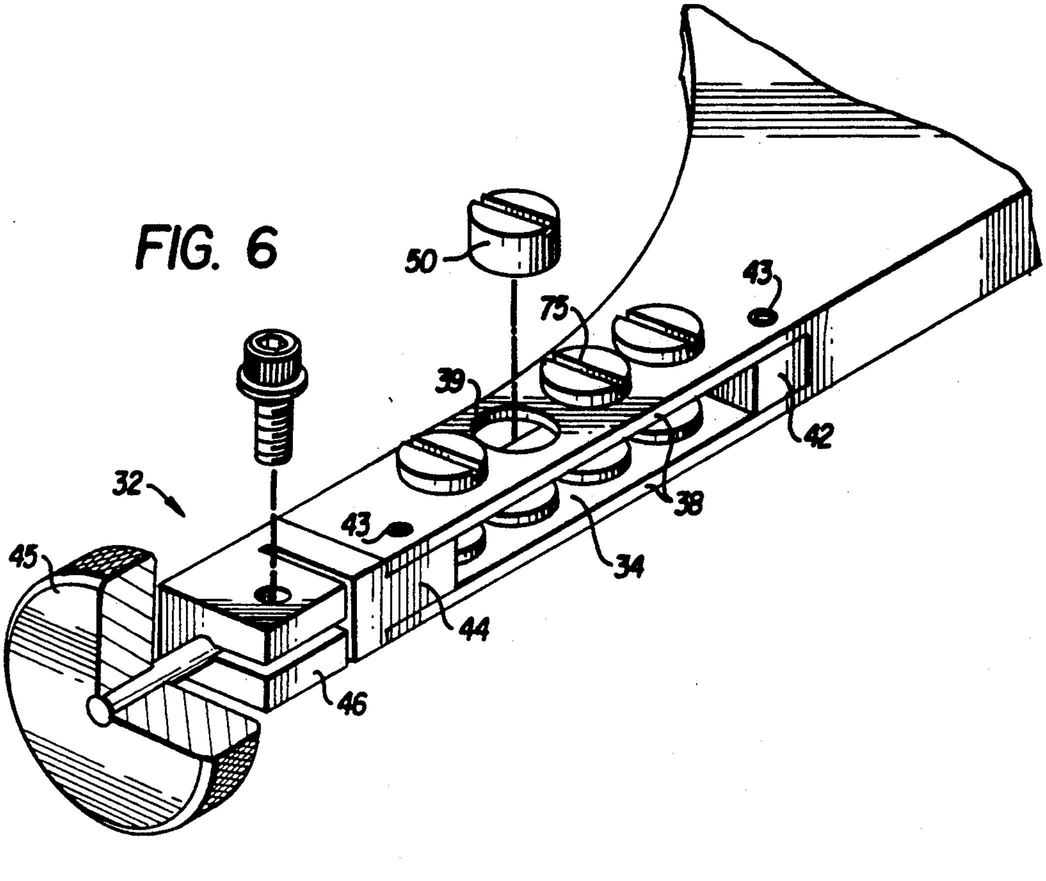
FIG. 6 is a perspective view of a second embodiment of the invention.

A second embodiment of the invention, represented by FIG. 6, differs from the first embodiment by location of the eccentric adjustment means. As in the first embodiment, a longitudinal slot 34 is provided along the yoke finger projection length between opposite face plates 38. Pads 50 slide through respective receptacle bores 39 into contact with an eccentric rod 39. Midbearing block 42 seats one distal end of the eccentric rod whereas end-bearing block 44 rotatably confines the other rod end. Roll pins 43 secure the position of both bearing blocks within the slot 34.

This FIG. 6 invention embodiment locates the manual adjustment wheel 45 at the outer or distal end of the yoke finger 32. A split journal clamp 46 closed by a cap screw 47 secures the desired angular position of the eccentric 62.

Figure 7:
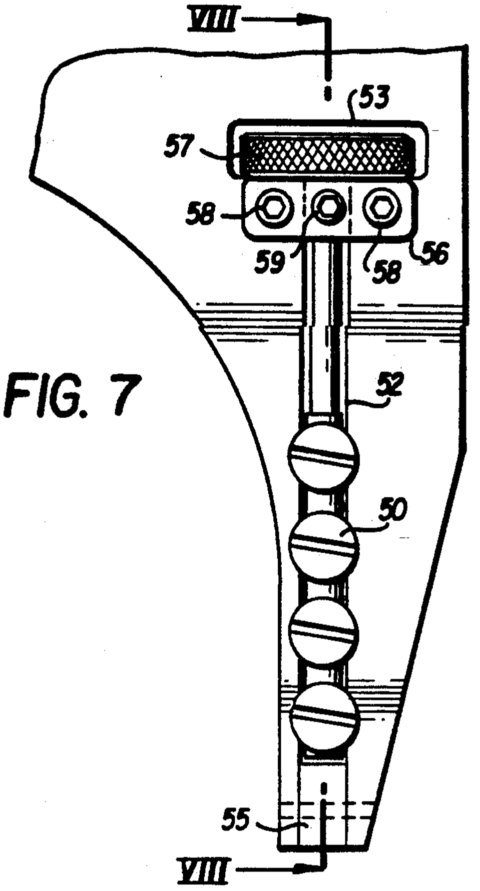
FIG. 7 is an elevational face view of a yoke finger equipped with a third embodiment of the invention.
Figure 8:
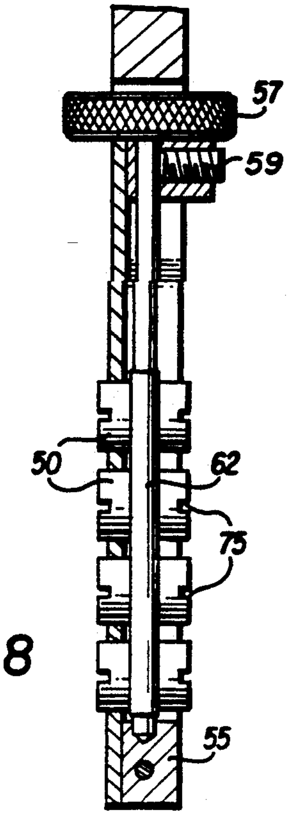
FIG. 8 is an elevational end view of a yoke finger equipped with a third embodiment of the invention.

The invention embodiment of FIGS. 7, 8 and 9 aligns a yoke finger slot 52 to open along one face of the finger assembly. The longitudinal slot 52 extends from the distal end of the finger 32 into a transverse through-slot 53. Disc pad receptacle bores 54 are of greater diameter than the slot 52 width thereby providing axial guideways for the pads 50 transverse of the yoke finger face. Along the slot 52 walls, these guideways take the form of fly cut channels.

Similar to the other embodiments, the pad adjustment eccentric 62 is unitized with an end bearing block 55 and a mid-bearing block 56. A manual adjustment wheel 57 secured to the end of the eccentric rod 62 is caged within the transverse slot 53 while the end-bearing block 55 is roll-pinned into finger slot 52. Cap screws 58 secure the mid-bearing block 56 to the yoke face and lock screw 59 clamps the desired angular position of the eccentric 62.

It will be noted that the pads 50 in all embodiments of the invention are provided with diametric slots 75 across the outer, head wheel groove engaging face thereof. Upon new installation, a temporary binder such as a band of rubber is passed around the yoke finger assembly and through the slots 75 for the purpose of retaining the bushing pads in the receptacle bores during the installation procedure. Once in place, the bushing pads 50 are externally confined by the head wheel groove walls 21 or 22. A retainer material such as rubber requires no specific removal step since operational heat of the machine will clear the retainer by ablation.

Having fully disclosed my invention, others of ordinary skill in the art may devise obvious mechanical equivalents to these specifically described preferred embodiments. As my invention, however,

I claim:

1. A box machine tool wheel stabilizing yoke having thrust surface adjustment means, comprising a yoke plate having finger-like projections from a base portion thereof, said base portion adapted for rigid attachment to a stationary structural portion of the box machine, said projections having parallel opposing face planes separated by a distance less than the separation distance between opposing groove wall planes respective to a cooperative stabilizing head wheel, said projections also having inner and outer edges thereof, receptacle dowel bores extended axially through said projections between said face planes and substantially perpendicular thereto, adjustment means having a surface rotatable about and eccentric to a common axis, disc pad means confined within said receptacle bores for axially slidable displacement therewithin in opposite directions from said projections against said head groove walls, said disc pad means including a thrust surface for engaging said head groove walls and a bearing surface for engaging said rotatable eccentric surface, said rotatable eccentric surface being positioned between said projection face planes with clamping means to secure a manually selected angular setting of said eccentric surface against said disc pad means bearing surface.

2. Apparatus as described by claim 1 wherein said yoke plate projections each include an elongated channel therewithin to receive said rotatable eccentric surface, said channel being defined between opposite plate portions of said yoke projection having said receptacle bores formed therewithin.

3. Apparatus as described by claim 2 wherein said rotatable eccentric surface comprises an elongated rod extended between journal blocks, said journal blocks being secured within said channel.

4. Apparatus as described by claim 1 wherein said yoke plate projections each include an elongated channel therewithin to receive said rotatable eccentric surface, said channel being formed into one of said parallel opposing face planes.

5. Apparatus as described by claim 4 wherein said rotatable eccentric surface comprises an elongated rod extended between journal blocks, said journal blocks being secured within said channel.

6. Apparatus for forming box blanks from corrugated paperboard sheet material, having paired tool wheels for mounting material forming tools on the perimeter thereof within an axial length segment of such wheel perimeter, respective wheels of a pair being secured to respective parallel axle shafts for rotation about a shaft axis, a circumferential slot portion of each wheel being axially positioned laterally of said tool segment, said slot being characterized by oppositely facing side walls in respective parallel planes that are substantially perpendicular to said axle shaft axis, yoke means having opposite parallel side faces and substantially perpendicular end faces secured to a frame portion of said apparatus, projecting finger portions of said yoke means meshed between said slot side wall planes, disc pad surface means disposed from said opposite side faces of said yoke means between said slot side walls and said yoke side faces, said disc pad surface means being slidably positioned within receptacle bores in said yoke finger portions eccentric adjustment means having an elongated rod with a surface eccentric to and rotatable about an axis of said rod and bearing upon an eccentric engagement portion of said disc pad surface means to slidably displace said disc pad surface means within respective receptacle bores, and clamping means to secure said eccentric adjustment means at a predetermined angle of rotation about said rod axis.

7. Apparatus as described by claim 6 wherein said yoke means finger portions each include an elongated channel therewithin to receive said eccentric adjustment means, said channel being defined between the opposite parallel side faces of said yoke means.

8. Apparatus as described by claim 7 wherein said eccentric elongated rod has an eccentric transverse section between journal blocks, said journal blocks being secured within said elongated channel.

9. Apparatus as described by claim 6 wherein said yoke means finger portions each include an elongated channel formed into one of said opposite parallel side faces to receive said eccentric adjustment means.

10. Apparatus as described by claim 9 wherein said elongated rod has an eccentric transverse section between journal blocks, said journal blocks being secured within said elongated channel.

* * * * *